Patented Sept. 15, 1931

1,822,967

UNITED STATES PATENT OFFICE

HANS HEYNA, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

NEW VAT DYESTUFFS

No Drawing. Application filed June 19, 1930, Serial No. 462,425, and in Germany July 8, 1929.

The present invention relates to the new dyestuffs of the following general formula:

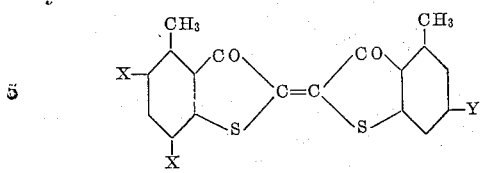

wherein X represents halogen and Y stands for methyl or halogen.

These dyestuffs are for instance obtainable by condensing a hydroxythionaphthene compound which is substituted in the 4-position by methyl and in the 6-position by methyl or halogen with a reactive 2-derivative of a 4-methyl-5-7-dihalogen-2.3-diketo-dihydroxythionaphthenequinone.

As is known to the art the condensation is preferably carried out at an elevated temperature as for instance at a temperature between about 70°–140° C. and advantageously in the presence of a solvent as for instance glacial acetic acid, chlorobenzene and so on.

The new dyestuffs are distinguished by good fastness to light, to washing and to chlorine, and above all by their vivid brilliant red tints.

The following examples illustrate the invention, but they are not intended to limit it thereto, the parts being by weight:

1. 36.5 parts of 4-methyl-5.7-dichloro-2.3-diketo - dihydrothionaphthenequinone - 2 (p-dimethylamino)-anil are heated together with 20 parts of 4-methyl-6-chloro-3-hydroxythionaphthene in 500 parts of glacial acetic acid at a temperature of 70° C. for 10 hours. After cooling the dyestuff of the following formula:

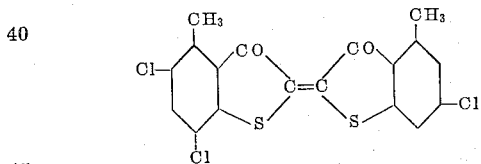

is filtered by suction and washed until neutral. It dyes cotton beautiful vivid bluish-pink tints of good fastness to light, washing and to chlorine.

2. 36.5 parts of 4-methyl-5.7-dichloro-2.3-diketodihydrothionaphthenequinone - 2 -(p-dimethylamino)-anil are heated together with 18 parts of 4.6 - dimethyl - 3 - hydroxythionaphthene in 500 parts of glacial acetic acid at a temperature of 70° C. for 10 hours. After cooling the dyestuff of the following formula:

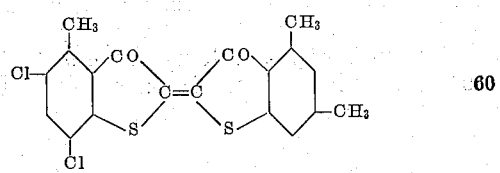

is filtered by suction and washed until neutral. It dyes cotton very vivid bluish-pink tints of excellent fastness to washing and to chlorine.

3. 33 parts of 4-methyl-6-chloro-2.3-diketodihydrothionaphthenequinone-2-(para-dimethylamino)-anil are heated with 33 parts of 4-methyl-5.7-dibromo-3-hydroxythionaphthene in 500 parts of glacial acetic acid for 10 hours at 70° C. After cooling, the dyestuff is filtered with suction and washed until neutral. It dyes cotton clear, vivid bluish pink tints of good fastness to washing and to chlorine. It has the formula:

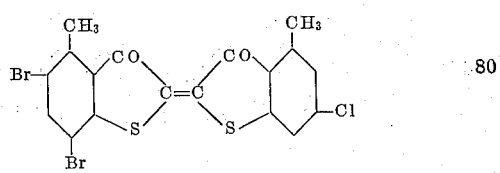

4. 31 parts of 4.6-dimethyl-2.3-diketodihydrothionaphthenequinone-2- (para-dimethylamino)-anil are heated at 70° C. with 33 parts of 4-methyl-5.7-dibromo-3-hydroxythionaphthene in 500 parts of glacial acetic acid until the formation of the dyestuff is finished. After cooling the dyestuff is filtered with suction and washed until neutral. It dyes cotton a pink tint similar to that obtained according to Example 2. It has the formula:

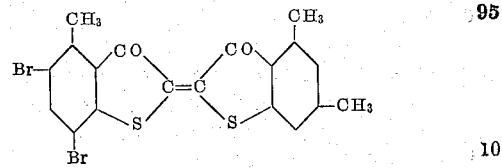

5. 38 parts of 4-methyl-6-bromo-2.3-diketodihydrothionaphthenequinone-2-(para-dimethylamino)-anil are heated with 33 parts of 4-methyl-5.7-dibromo-3-hydroxythionaphthene in 500 parts of glacial acetic acid until the formation of the dyestuff is finished. After cooling, the dyestuff is filtered with suction and washed until neutral. It dyes cotton beautiful, vivid bluish pink tints of a more bluish hue than the dyestuffs obtainable according to Examples 1–4 of good fastness to washing and to chlorine. It has the formula:

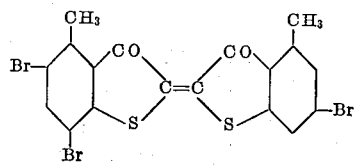

6. 38 parts of 4-methyl-6-bromo-2.3 diketodihydrothionaphthenequinone-2-(para-dimethylamino)-anil are heated with 28 parts or 4-methyl-5-chloro-7-bromo-3-hydroxythionaphthene in 500 parts of glacial acetic acid until the formation of the dyestuff is finished. After cooling, the dyestuff is filtered with suction and washed until neutral. It dyes cotton pink tints having properties similar to those obtained according to Example 5. The dyestuff has the formula:

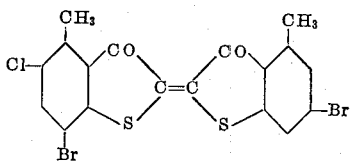

I claim:
1. As new products the compounds of the following general formula:

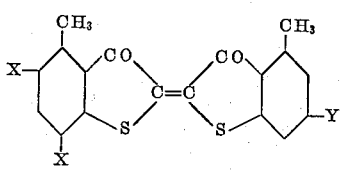

wherein X represents halogen and Y stands for methyl or halogen possessing good fastness properties and vivid brilliant red tints.

2. As new products the compounds of the following general formula:

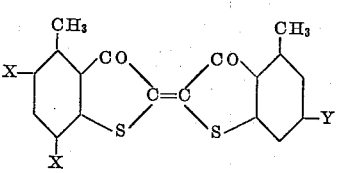

wherein X stands for chlorine or bromine and Y for methyl chlorine or bromine posessing good fastness properties and vivid brilliant red tints.

3. As a new product the compound of the following formula:

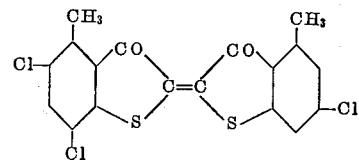

dyeing cotton a beautiful vivid bluish-pink tint of good fastness to light, washing, and to chlorine.

4. As a new product, the compound of the following formula:

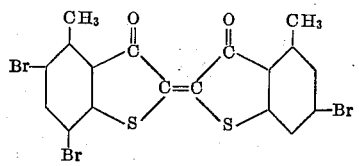

dyeing cotton beautiful vivid bluish pink tints of good fastness to washing and to chlorine.

5. As a new product, the compound of the following formula:

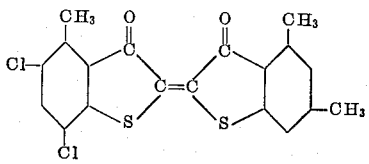

dyeing cotton very vivid bluish-pink tints of excellent fastness to washing and to chlorine.

In testimony whereof, I affix my signature.
HANS HEYNA.